United States Patent Office 2,875,122
Patented Feb. 24, 1959

2,875,122

FUNGICIDE

Milton Kosmin, Dayton, Ohio, assignor to Monsanto Chemical Company, St. Louis, Mo., a corporation of Delaware No Drawing. Application May 6, 1955
Serial No. 506,655

16 Claims. (Cl. 167—30)

This invention relates to hitherto unkown sulfo esters of certain benzoic acids, to methods of preparing the same, fungicidal compositions comprising the new esters and to methods of destroying fungi therewith.

The present esters have the formula

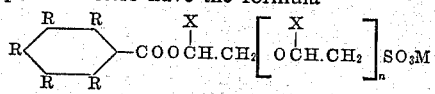

where R is selected from the class consisting of hydrogen, halogen and nitro radicals, X is selected from the class consisting of hydrogen and the methyl radical, $n$ is a number of from 0 to 14, and M is a water-solubilizing cation.

Compounds of the above formula are obtained by the condensation of the appropriate hydroxyalkanesulfonic acid or (hydroxyalkoxy)alkanesulfonic acid, e. g., isethionic acid or 2-methylisethionic acid or the hydroxy ether of such an acid and a polyalkylene glycol, or a water-soluble salt thereof, with the appropriate benzoic acid or acyl halide thereof, substantially according to the scheme:

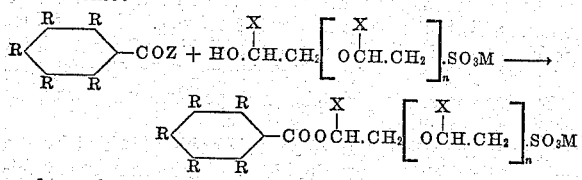

to form the acid in which R, X, M and $n$ are as defined above, and Z denotes a halogen atom or the OH radical.

Compounds of the above formula may be prepared, for example, by reacting benzoic acid, of the formula $C_6H_5COOH$, with isethionic acid, 2-methylisethionic acid, the diethylene glycol ether of isethionic acid, etc., to produce the present esters.

Benzoic acids or acyl halides thereof having the above formula and useful for the present purpose also include the class of ar-chlorinated benzoic aids having from 1 to 5 chlorine atoms substituted on the benzene ring thereof. Examples of such ar-chlorinated benzoic acids are: 4-chloro-, 2,4-dichloro-, 2,4,5-trichloro-, 2,3,4,5-tetrachloro-, and 2,3,4,5,6-pentachlorobenzoic acids. Another useful class of substituted benzoic acids are the ar-iodinated benzoic acids; examples of such ar-iodinated benzoic acids are 2-iodobenzoic acid, 2,3-diiodobenzoic acid, 2,3,5-triiodobenzoic acid, etc. Another example of useful ar-halogenated benzoic acids of the above formula are the bromobenzoic acids such as 2,3,5-tribromobenzoic acid, 2,5-dibromobenzoic acid, etc.

Still another class of ar-halogenated benzoic acids of the above formula and useful for the present purpose are the ar-halogenated benzoic acids containing two different types of halogen-substituents on the benzene ring. Examples of such halobenzoic acids are: 5-bromo-2-iodobenzoic acid, 5-bromo-2,3-dichlorobenzoic acid, 2,3-dibromo-5-iodobenzoic acid, 5-bromo-3-chloro-2-iodobenzoic acid, etc.

Another class of useful benzoic acid derivatives of the above formula are the ar-nitro-substituted and ar-nitro-ar-halo-substituted benzoic acids. An example of the ar-nitro-substituted benzoic acids is 2,5-dinitrobenzoic acid; examples of ar-nitro-ar-halo-substituted benzoic acids are 2-bromo-3-nitrobenzoic acid, 3-bromo-2-nitrobenzoic acid, 3-bromo-4-nitrobenzoic acid, 2-chloro-3-nitrobenzoic acid, 2-iodo-3-nitrobenzoic acid, etc.

Isethionic acid compounds having the above formula and reactive with the above benzoic acids to yield the present improved fungicidal compounds are isethionic acid, 2-methylisethionic acid and the water-soluble salts thereof, e. g., the alkali metal isethionates or 2-methylisethionates such as sodium, potassium or lithium isethionate or 2-methylisethionate, ammonium isethionate or 2-methylisethionate, organic amine salts of the isethionates such as the dimethylamine, the butylamine, the triethylamine, the ethanolamine, the isopropanolamine, the tri-n-propanolamine or the morpholine salts of isethionic or 2-methylisethionic acid. Hydroxy ethers of such isethionic acid compounds, obtainable, e. g., by reaction of said isethionic acid compounds with ethylene glycol, polyalkylene glycols or with ethylene oxide, are also useful in the preparation of the present esters. As examples of such hydroxy ethers may be mentioned: 2-(2-hydroxyethoxy)ethanesulfonic acid and water-soluble salts thereof, the hydroxy ethers obtainable by reaction of isethionic acid or 2-methylisethionic acid or the salts thereof with diethylene glycol, pentaethylene glycol, or octaethylene glycol, etc. The useful polyalkylene glycol ethers may also be prepared by condensing ethylene oxide or isopropylene oxide with the isethionic acid or 2-methylisethionic acid.

Componds obtainable by the condensation of said benzoic acids and said isethionic acid compounds are, for example, salts of 2-sulfoethyl or 2-sulfopropyl ar-halogenated, ar-nitrated, or unsubstituted benzoates.

Examples of such 2-sulfoethyl or 2-sulfopropyl esters of benzoic acid are: 2-sulfoethyl benzoate, 2-(sodium sulfo)ethyl benzoate, 2-sulfopropyl benzoate, 2-(potassium sulfo)propyl benzoate, triethylamine salt of 2-sulfoethyl benzoate, ethanolamine salt of 2-sulfoethyl benzoate, morpholine salt of 2-sulfoethyl benzoate, etc.

As examples of such 2-sulfoethyl or 2-sulfopropyl ar-chlorinated benzoates may be mentioned: 2-sulfoethyl 4-chlorobenzoate, 2-(ammonium sulfo)ethyl 3-chlorobenzoate, 2-(sodium sulfo)propyl 2-chlorobenzoate, 2-(sodium sulfo)ethyl 2,5-dichlorobenzoate, 2-(sodium sulfo)ethyl 2,4,5-trichlorobenzoate, dibutylamine salt of 2-sulfoethyl 3,5-dichlorobenzoate, isopropanolamine salt of 2-sulfoethyl 3,4,5-trichlorobenzoate, etc.

As examples of such 2-sulfoethyl or 2-sulfopropyl ar-brominated benzoates may be mentioned: 2-sulfoethyl 4-bromobenzoate, 2-(sodium sulfo)ethyl 2,5-dibromobenzoate, triethanolamine salt of 2-sulfoethyl 3,5-dibromobenzoate, morpholine salt of 2-sulfoethyl 2,3,5-tribromobenzoate, etc.

As examples of such 2-sulfoethyl or 2-sulfopropyl iodobenzoates may be mentioned: 2-sulfoethyl 4-iodobenzoate, 2-(sodium sulfo)ethyl 2,5-diiodobenzoate, 2-(potassium sulfo)ethyl 3,5-diiodobenzoate, trimethylamine salt of 2-sulfopropyl 2,3,5-triiodobenzoate, diethylenetriamine salt of 2-sulfoethyl 2,4,5-triiodobenzoate, etc.

As examples of such benzoates containing mixed halogen substituents may be mentioned: 2-sulfoethyl 5-bromo-2-iodobenzoate, 2-(lithium sulfo)ethyl 5-bromo-2,3-dichlorobenzoate, 2-(ammonium sulfo)ethyl 5-chloro-2,3-dibromobenzoate, n-butylamine salt of 2-sulfoethyl 2,3-dibromo-5-iodobenzoate, diethylenetriamine salt of 2-sulfopropyl 3,5-dibromo-5-iodobenzoate, morpholine salt of 2-sulfopropyl 3,5-dichloro-5-iodobenzoate, etc.

As examples of 2-sulfoethyl or 2-sulfopropyl nitrated benzoate esters may be mentioned: 2-sulfoethyl 3-nitrobenzoate, 2-sulfopropyl 2,5-dinitrobenzoate, triisopropanolamine salt of 2-sulfoethyl 2,4,6-trinitrobenzoate, etc.

Examples of the presently provided 2-sulfoethyl or 2-sulfopropyl benzoates containing both nitro and halogen substituents are: 2-sulfoethyl 2-bromo-3-nitrobenzoate, 2-(ammonium sulfo)ethyl 3-bromo-2-nitrobenzoate, 2-sulfopropyl 3-bromo-4-nitrobenzoate, 2-(lithium sulfo)-ethyl 2-chloro-3-nitrobenzoate, 2-(sodium sulfo)ethyl 2-iodo-3-nitrobenzoate, dibutylamine salt of 2-sulfoethyl 2-bromo-3-nitrobenzoate, morpholine salt of 2-sulfoethyl 4-bromo-3-nitrobenzoate, etc.

The above compounds are prepared by employing isethionic acid or 2-methylisethionic acid or the salts thereof as the hydroxy component in the preparation of the present esters. As has been herein stated, the isethionic acid compounds may be replaced by hydroxy ethers thereof such as the mono- or polyethers of ethylene or isopropylene glycol and the isethionic or 2-methylisethionic compounds. As examples of esters of benzoic acid and the monoalkylene glycol ethers of the isethionic acid may be mentioned: 2-(2-sodium sulfoethoxy)ethyl benzoate, 2-(2-ammonium sulfoethoxy)ethyl benzoate, 2-(2-sodium sulfopropoxy)ethyl benzoate, the dibutylamine salt of 2-(2-sulfoethoxy)propyl benzoate, etc.

As examples of the esters of the present benzoic acids and polyalkylene glycol ethers of isethionic or 2-methylisethionic acid may be mentioned: the sodium salt of 2,4,5-trichlorobenzoic acid and the pentaethylene glycol ether of isethionic acid, the sodium salt of the ester of 2,3,5-triiodobenzoic acid and the diethylene glycol ether of isethionic acid, the morpholine salt of the ester of 3,5-diiodobenzoic acid and the hexaisopropylene glycol ether of 2-methylisethionic acid, etc.

In preparing the present sulfoalkyl esters, I operate substantially as follows: I contact the isethionic acid compound, e. g., isethionic or 2-methylisethionic acid or a salt thereof, with the benzoic acid compound at a temperature of from room temperature up to below the decomposition point of the reaction mixture until formation of the sulfoalkyl ester has occurred. An inert diluent may or may not be employed. As diluents, I may use any inert liquid such as an aromatic compound, e. g., benzene, an aliphatic liquid, e. g., hexane, a chlorinated hydrocarbon, e. g., carbon tetrachloride, etc. Since the reaction occurs by the condensation of one mole of the isethionic compound with one mole of the benzoic acid compound, equimolecular proportions of the reactants generally will be employed, although a slight excess of the more readily obtainable component may be used if desired, in order to assure complete reaction of the less obtainable component. The reaction may be effected at ordinary atmospheric, subatmospheric, or superatmospheric pressures. Particularly at the higher temperatures such as those above 200° C., it is advantageous to operate at a diminished pressure, e. g., at a pressure of from 10 to 100 mm. of mercury. Catalysts may or may not be employed; useful catalysts comprise the organic or inorganic acid or basic metals, e. g., sulfuric acid, toluenesulfonic acid, sodium ethoxide, etc. The reaction product, i. e., the sulfoalkyl ester, is separated from the resulting reaction mixture by simply removing any unreacted constituents, as by distilling, decanting, washing, extracting, etc. If the use of a diluent is omitted, and substantially equimolecular proportions of the isethionic salt and the benzoic acid compound are contacted for sufficient time to produce complete reaction, the reaction product consists of the substantially pure salt of the sulfoalkyl ester and in this case, no further treatment of the product is required.

As will be apparent to those skilled in the art, use of the free isethionic or 2-methylisethionic acid in the condensation reaction will result in the formation of the free sulfonic acid. While the free acid may be employed as the active ingredient in the formulation of fungicidal compositions, for ease in manipulation and storage, I prefer to use the present acids in the form of the sulfonate salts. The free sulfonic acid esters of the present invention may be converted to their salts by neutralization with an appropriate organic or inorganic basically-reacting agent until a neutral product is obtained. Useful basic materials in the neutralization step are alkali metal hydroxides or the basically-reacting salts thereof, water-solubilizing alkyl or alkylene amines, ammonium hydroxide or basically-reacting salts thereof, morpholine, etc.

The invention is further illustrated, but not limited, by the following examples:

*Example 1*

To a 1-liter reaction vessel equipped with a mechanical stirrer, thermometer, and reflux condenser were charged 187.9 g. (1.2 moles) of ortho-chlorobenzoic acid and 148.0 g. (1.0 mole) of sodium isethionate. The temperature of the reactants was raised to above 200° C. and the mixture was stirred vigorously at 210–250° C. for 3¼ hours, during which time a total of 15.5 ml. of water were evolved. At the end of the heating time, the product was poured off from the flask, cooled, ground with acetone, filtered, washed and filtered twice more with acetone, then ground and dried. A yield of 219.6 g. of crude 2-(sodium sulfo)ethyl ortho-chlorobenzoate was obtained.

*Example 2*

To a 1-liter reaction vessel equipped as in the above example were charged 168.7 g. (1.2 moles) of benzoyl chloride and 148.0 g. of sodium isethionate. The mixture was heated slowly up to 65° C. over a period of 2½ hours. As the reaction proceeded, the reaction mixture became too thick to stir, whereupon 200 g. of carbon tetrachloride were added to act as a solvent. This mixture was refluxed at 82° C. for 2 hours further. When the evolution of hydrogen chloride had substantially decreased, the mixture was cooled and subjected to vacuum distillation to remove the solvent. The residual solid was washed with acetone and filtered three times after which it was dried. The impure 2-(sodium sulfo)-ethyl benzoate, assaying about 83 percent ester, weighed 200.5 g.

The new sulfo esters of benzoic acids provided by the present invention are stable, high-melting, waxy to crystalline compounds which are useful for a number of industrial and agricultural applications. They may be used, e. g., as anti-oxidants in oils and fats, soaps, rubbers, latex, etc. The polyoxyalkylene long-chain sulfo esters may be used, for example, as surfactants. The agricultural uses of the new esters include their application as fungicides, as described below.

The biological toxicant activities of the new esters are surprising; for example, while sodium benzoate is a well-known bacteriostat, the present compounds have not been found to possess any substantial bacteriostatic activity. However, they are particularly active fungicides, as further illustrated below:

*Example 3*

Approximately 10 seeds of a rust-susceptible variety of wheat (Seneca) were planted in each of five 4″ clay pots filled with soil, after which the pots were held in the greenhouse at 75° F. and watered daily for six days. The six-day old seedlings were sprayed with water from an atomizer and then gently rubbed by hand to remove the "bloom." After this, a scapel loaded with spores of the species *Puccinia rubigo-vera tritici* (the wheat-leaf rust agent) was rubbed up and down the back sides of the leaves. Following this inoculation, the plants were again sprayed with a fine mist of water and placed in incubation chambers where they were held for two days at 100 percent humidity at approximately 70° F. The pots were then transferred to greenhouse benches for an additional 48 hours, after which two of them were sprayed from an atomizer with 10 ml. each of an 0.5 percent aqueous solution of the o-chlorobenzoate ester product of Example 1, and two, with 10 ml. each of an 0.5 percent aqueous solution of the benzoate ester product of Example 2. The fifth pot was reserved as a control. The five pots of wheat plants were then held in the greenhouse for one week, after which they were examined for the effectiveness of the treatment. The plants which had been sprayed with either of the sulfoethyl esters were substantially free of infection, there being evidence of only a few small rust pustules on the treated plants, whereas the control pot, the plants in which had been subjected to precisely the same treatment with the exception of the chemical treatment with the benzoate esters, exhibited many large pustules.

The fungicidal and plant therapeutant activity of the present esters is also illustrated by the following example:

Example 4

Four week old, Bonny Best variety, tomato plants were watered for three successive days with 30 ml. each of an aqueous solution of an 0.01 percent concentration of 2-(sodium sulfo)ethyl benzoate. On the fourth day, these tomato plants, plus a control plant which had not been treated with the benzoate, were uprooted and about one-third of the root system of each plant was torn off. The remaining roots on each plant were then washed in water and immersed in a suspension of *Fusarium oxyporum* f. *lycopersici* (the organism causing tomato wilt disease) for 30 seconds. The plants were then repotted and kept in a greenhouse.

When the control plant, the tomato plant which had not been watered with the benzoate ester solution, showed marked disease symptoms, the plants which had received the 2-(sodium sulfo)ethyl benzoate treatment were seen to be in good physical condition; when these plants were uprooted, examination of the vascular bundles showed that substantial control of the disease had been attained.

The present compounds are thus shown to be highly useful plant therapeutants for the control of fungus diseases. Previously-known fungicides have suffered from the disadvantages of excessive phytotoxicity at the application levels required for fungus control, and/or a physical or chemical nature such as to preclude commercially expedient means of application. The very good water solubility of the present compounds, in contrast, makes their application to crops extremely simple; their aqueous solutions can be easily prepared at the point of use. Furthermore, the present sulfo benzoates, in contrast to the benzoate esters known hitherto, are surprisingly non-volatile.

The plant diseases which may be controlled by application of the present sulfo esters include, e. g., cereal rusts of grains, such as the stem rust, *Puccinia graminis tritici*, the leaf rust, *P. rubigo-vera tritici*, and the stripe rust, *P. glumarum*, of wheat; the stem and crown rusts of oats (*P. graminis avenae* and *P. coronata avenae*); the stem rust of rye (*P. graminis secalis*); the leaf rust of barley (*P. hordei*), etc. Other fungus diseases of broadleaf plants which may also be controlled by application of the present compounds are, for example, the American gooseberry mildew (*Spherotheca mors-uve*), tomato leaf mold (*Sladosporium fulvum*), apple scab (*Venturia inequalis*), tomato wilt (*Fusarium oxysporum* f. *lycopersici*), etc.

Since the esters of the invention have both contact and systemic activity, as demonstrated above, they may be applied either to the plants themselves or to the soils in which the plants which have contracted or may be exposed to the fungus disease are growing. The fungicidal compounds may be applied directly to the plants; however, because the present products are effective in extremely dilute concentrations, it is preferred to incorporate them into a carrier or diluent. Most conveniently, the present esters are formulated for application by dissolving them in water; for example, solutions of these esters may be applied to fields through an irrigation system. The use of powdered carriers for application as dusts, or the use of emulsions of these compounds is not, however, precluded.

Further details of the methods of preparation and application of the present compounds will be readily evident to those skilled in the art.

What is claimed is:

1. A sulfo ester having the formula

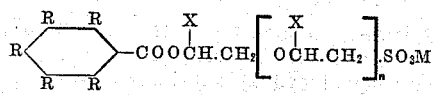

where R is selected from the class consisting of hydrogen, halogen and nitro radicals, X is selected from the class consisting of hydrogen and the methyl radical, $n$ is a number of from 0 to 14, and M is a water-solubilizing cation providing a water soluble salt.

2. An alkali metal salt of a 2-sulfoethyl benzoate.
3. 2-(sodium sulfo)ethyl benzoate.
4. 2-(sodium sulfo)ethyl ortho-chlorobenzoate.
5. The method which comprises contacting an isethionic acid of the formula.

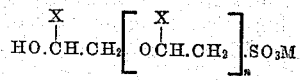

in which X is selected from the class consisting of hydrogen and the methyl radical, M is a water-solubilizing cation providing a water soluble salt and $n$ is an integer of from 0 to 14, with a benzoic acid of the formula

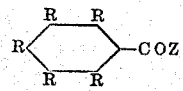

where R is selected from the class consisting of hydrogen, halogen and nitro radicals, and Z is selected from the class consisting of halogen atoms and the OH radical, and separating from the resulting reaction product a sulfo ester having the formula

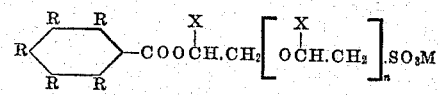

where R, X, $n$ and M are as defined hereinabove.

6. The method which comprises heating, at a temperature of from 100 to 300° C., sodium isethionate with ortho-chlorobenzoic acid and separating from the resulting reaction product 2-(sodium sulfo)ethyl ortho-chlorobenzoate.

7. The method which comprises contacting sodium isethionate with benzoyl chloride at a temperature of above 50° C. but less than the decomposition temperature of the reaction mixture and separating the resulting reaction product 2-(sodium sulfo)ethyl benzoate.

8. A fungicidal composition comprising an inert carrier, and as the essential active ingredient a sulfo ester of the formula

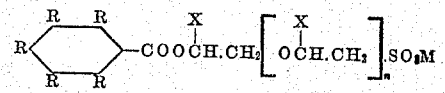

where R is selected from the class consisting of hydrogen, halogen and nitro radicals, X is selected from the class consisting of hydrogen and the methyl radical, $n$ is a number of from 0 to 14, and M is a water-solubilizing cation providing a water soluble salt.

9. A fungicidal composition comprising an inert carrier and, as the essential active ingredient, 2-(sodium sulfo)ethyl benzoate.

10. A fungicidal composition comprising an inert carrier and, as the essential active ingredient, 2-(sodium sulfo)ethyl ortho-chlorobenzoate.

11. The method of destroying fungi which comprises applying to said fungi a toxic quantity of a fungicidal composition comprising as the essential active ingredient a sulfo ester having the formula

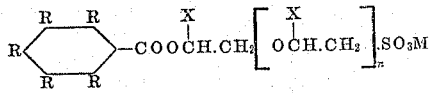

where R is selected from the class consisting of hydrogen, halogen and nitro radicals, X is selected from the class consisting of hydrogen and the methyl radical, $n$ is a number of from 0 to 14, and M is a water-solubilizing cation providing a water soluble salt.

12. The method of destroying fungi which comprises applying to said fungi a toxic quantity of a fungicidal composition comprising 2-(sodium sulfo)ethyl benzoate.

13. The method of destroying fungi which comprises applying to said fungi a toxic quantity of a fungicidal composition comprising 2-(sodium sulfo)ethyl ortho-chlorobenzoate.

14. The method of inhibiting the development of fungus diseases in plants which comprises applying to said plants a fungus-inhibiting quantity of a fungicidal composition comprising an inert carrier and, as the essential active ingredient, a fungicidal amount of a sulfo ester of the formula

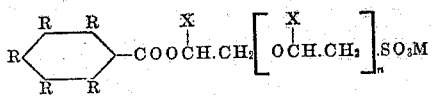

where R is selected from the class consisting of hydrogen, halogen and nitro radicals, X is selected from the class consisting of hydrogen and methyl radical, $n$ is a number of from 0 to 14, and M is a water-solubilizing cation providing a water soluble salt.

15. The method of inhibiting the development of fungus diseases in plants which comprises applying to said plants a fungus-inhibiting quantity of a fungicidal composition comprising an inert carrier and, as the essential active ingredient, a fungicidal amount of 2-(sodium sulfo)ethyl benzoate.

16. The method of inhibiting the development of fungus disease in plants which comprises applying to said plants a fungus-inhibiting quantity of a fungicidal composition comprising an inert carrier and, as the essential active ingredient, a fungicidal amount of 2-(sodium sulfo)ethyl ortho-chlorobenzoate.

References Cited in the file of this patent
UNITED STATES PATENTS 2,193,944    Steindorff et al. _____ Mar. 19, 1940